United States Patent
O'Gorman et al.

(10) Patent No.: US 7,915,888 B2
(45) Date of Patent: Mar. 29, 2011

(54) SYSTEMS AND METHODS FOR DETECTING ANGULAR POSITION

(75) Inventors: Patrick A. O'Gorman, Grayslake, IL (US); Rene Vivanco, Peachtree City, GA (US); Alex Kurnia, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 228 days.

(21) Appl. No.: 12/061,635

(22) Filed: Apr. 2, 2008

(65) Prior Publication Data
US 2009/0251089 A1 Oct. 8, 2009

(51) Int. Cl.
*G01R 33/00* (2006.01)
*G01B 7/14* (2006.01)

(52) U.S. Cl. ........... 324/207.2; 318/400.37; 318/400.01; 318/661; 318/603; 318/592; 318/594; 324/207.11; 324/207.24; 324/207.25; 324/200; 324/207.12; 324/207.13; 324/251; 324/330

(58) Field of Classification Search ............. 318/400.37, 318/400.01, 661, 603, 592, 594, 60; 388/800, 388/805, 808, 812, 813, 814, 820; 324/207.2, 324/207.24, 207.25, 200, 207.11, 207.12, 324/207.13, 251, 330
See application file for complete search history.

(56) References Cited

U.S. PATENT DOCUMENTS

| | | | |
|---|---|---|---|
| 4,285,240 A * | 8/1981 | Gold | 73/462 |
| 4,295,085 A * | 10/1981 | Lafuze | 318/721 |
| 4,535,372 A * | 8/1985 | Yeakley | 360/77.05 |
| 4,786,891 A | 11/1988 | Ueda et al. | |
| 4,879,502 A * | 11/1989 | Endo et al. | 318/723 |
| 4,978,895 A * | 12/1990 | Schwarz | 318/400.04 |
| 4,992,716 A * | 2/1991 | Ellis | 318/661 |
| 5,140,245 A * | 8/1992 | Stacey | 318/723 |
| 5,461,293 A * | 10/1995 | Rozman et al. | 318/603 |
| 5,495,163 A * | 2/1996 | Rozman et al. | 322/10 |
| 6,191,545 B1 * | 2/2001 | Kawabata et al. | 318/400.01 |
| 6,337,548 B2 * | 1/2002 | Kawabata et al. | 318/400.04 |
| 6,400,143 B1 * | 6/2002 | Travostino et al. | 324/207.22 |
| 6,563,284 B2 * | 5/2003 | Teutsch et al. | 318/599 |
| 6,647,325 B2 * | 11/2003 | Shimazaki et al. | 701/22 |
| 6,747,834 B1 * | 6/2004 | Matsuyama | 360/77.03 |
| 6,772,101 B1 * | 8/2004 | Tanaka et al. | 702/198 |
| 6,826,499 B2 * | 11/2004 | Colosky et al. | 702/85 |
| 7,049,813 B2 * | 5/2006 | Morita et al. | 324/251 |
| 7,230,422 B2 * | 6/2007 | Morita et al. | 324/251 |
| 7,342,378 B2 * | 3/2008 | Sakamoto et al. | 318/717 |
| 2002/0024336 A1 | 2/2002 | Desbiolles et al. | |

OTHER PUBLICATIONS

Initial Rotor Position Estimation Method for PM Motors; Marco Tursini, Member, IEEE Roberto Petrella, Member, IEEE, and Francesco Parasiliti; IEEE Transactions on Industry Applications, vol. 39, No. 6, Nov./Dec. 2003.

(Continued)

*Primary Examiner* — Rita Leykin (57) ABSTRACT

Methods and systems for detecting an angular position of an electric motor are disclosed, including sending an electrical pulse through a stator coil of the electric motor, determining an approximate angular position of a rotor of the electric motor in response to detecting an timing of a returning electrical pulse from the stator coil, the timing of the returning electrical pulse being indicative of the angular position of the rotor; and determining an accurate position of the rotor in response to sensing a transition of a digital sensor in response to the rotor rotating relative to the stator, the transition being indicative of the accurate position.

18 Claims, 5 Drawing Sheets

OTHER PUBLICATIONS

New Initial Position Detection Technique for Three-Phase Brushless DC Motor Without Position and Current Sensors, Yen-Shin Lai, Senior Member, IEEE, Fu-San Shyu, and Shian Shau Tseng; IEEE Transactions on Industry Applications, vol. 39, No. 2, Mar./Apr. 2003.

The Next Generation of Position Sensing parts I and II, Mar. 2001, Sensors; Asad M. Madni, Jim B. Vuong, and Roger F. Wells, BEI Technologies, Inc. http://archives.sensorsmag.com/articles.

Angular Position Sensing with 2-Axis Hall IC 2SA-10, AN-101 Sentron, Lou Law, Magnetic Sensors, Feb. 12, 2004, 7 pages.

Delphi Non-Contact Rotary Position Sensor, www.delphi.com, 2008 Delphi Corporation.

Lessons in Electric Circuits—vol. II, Tony R. Kuphaldt, www.ibiblio.org/kuphaldt/electriccircuits; (72 pages).

* cited by examiner

SYSTEMS AND METHODS FOR DETECTING ANGULAR POSITION

I. BACKGROUND

The invention relates generally to the field of detecting angular positions and in some embodiments to detecting angular positions of rotors of electric motors.

II. SUMMARY

In one respect, disclosed is a method for detecting an angular position of an electric motor, the method comprising: sending an electrical pulse through a stator coil of the electric motor; determining an approximate angular position of a rotor of the electric motor in response to detecting a timing of a returning electrical pulse from the stator coil, the timing of the returning electrical pulse being indicative of the angular position of the rotor; and determining an accurate position of the rotor in response to sensing a transition of a digital sensor in response to the rotor rotating relative to the stator, the transition being indicative of the accurate position.

In another respect, disclosed is a system for detecting an angular position of an electric motor, the system comprising: a rotor configured to generate a magnetic field; one or more stator coils rotatively coupled to the rotor; a digital sensor positioned such that the digital sensor senses relative motion between the rotor and the one or more stator coils; a control circuit electrically coupled to the one or more stator coils and to the digital sensor; the control circuit being configured to: send an electrical pulse through the one or more stator coils, receive a returning electrical pulse, detect a timing of the returning electrical pulse, in response thereto, determine an approximate angular position of the rotor, the timing of the returning electrical pulse being indicative of the angular position of the rotor, receive a signal from the digital sensor indicating sensed transitions; determine an accurate position of the rotor in response to receiving the signal from the digital sensor.

In yet another respect, disclosed is a electric motor comprising: a rotor configured to generate a magnetic field; one or more stator coils rotatively coupled to the rotor; a digital sensor positioned such that the digital sensor senses relative motion between the rotor and the one or more stator coils; a control circuit electrically coupled to the one or more stator coils and to the digital sensor; the control circuit being configured to: send an electrical pulse through the one or more stator coils, receive a returning electrical pulse, detect a timing of the returning electrical pulse, in response thereto, determine an approximate angular position of the rotor, the timing of the returning electrical pulse being indicative of the angular position of the rotor, receive a signal from the digital sensor indicating sensed transitions; determine an accurate position of the rotor in response to receiving the signal from the digital sensor.

Numerous additional embodiments are also possible.

III. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, the angular position of an electric motor is to be determined. In some embodiments, the angular position (and optionally the desired direction of rotation) may be determined in order for the appropriate current (amplitude and phase, for example) to be supplied to the electric motor.

In some embodiments, an electrical pulse may be sent through at least one of the stator coils of the electric motor in order to determine an approximate angular position of the rotor of the electric motor. The timing of the returning pulse, among other factors, is affected by the current position of the rotor (power magnet, in some embodiments) of the electric motor though the interaction of the magnetic flux from the rotor and the magnetic flux generated by the pulse travelling through the coil. Thus, an approximate position of the rotor may be determined in response to detecting the timing of a returning electrical pulse from the stator coil.

In other embodiments, the electric motor may include additional stator coils. For example, the electric motor may include three stator coils as would be the case, for example, for a three-phase AC electric motor. Additional electrical pulses may be sent through the additional coils and the timing of those additional pulses may be detected. Since the coils are typically spaced apart, each pulse timing indicates a different perspective of the angular position of the rotor. The information from all the pulses may be combined to more accurately determine the angular position of the rotor.

In some embodiments, the electric motor may also include additional pairs of power magnets giving rise to additional effective electrical revolutions for each mechanical revolution. Accordingly, it should be noted, that any references to degrees, revolutions, etc herein may be references to the equivalent effective electrical degrees, revolutions, etc.

In some embodiments, a more accurate angular position may be determined using a digital sensor. The digital sensor may include a detector and a transition ring (having patterns corresponding to high and low signals) to be detected by the detector. The detector and transition ring may be mounted such that they rotate relative to each other as the motor rotates. For example, the transition ring may be mounted such that the pattern rotates in-sync with the rotor and the detector may be mounted stationary or vice versa. The digital sensor may be any suitable device that can generate a series of low and high signals while the transition ring rotates in relation to the detector. For example, the digital sensor may be a laser that is either reflected or not by the transition ring; a Hall sensor rotating over north and south magnets, a reluctance sensor, etc.

In some embodiments, the electric motor may also comprise one or more high-resolution digital sensors that use a higher resolution transition rings. In one embodiment, two high resolution digital sensors having a period of 60 degrees may be used, the two high resolution digital sensors may be in quadrature with each other. The signals from the high resolution digital sensors may be combined with the low resolution signal to determine the direction in which the rotor is moving.

In some embodiments, the electric motor may be calibrated such that a specific transition of the digital sensor is known to a high degree of accuracy. In such embodiments, once the calibrated transition occurs, the angular position of the rotor may be determined to a great degree of accuracy once that particular transition is detected.

Figure 1:
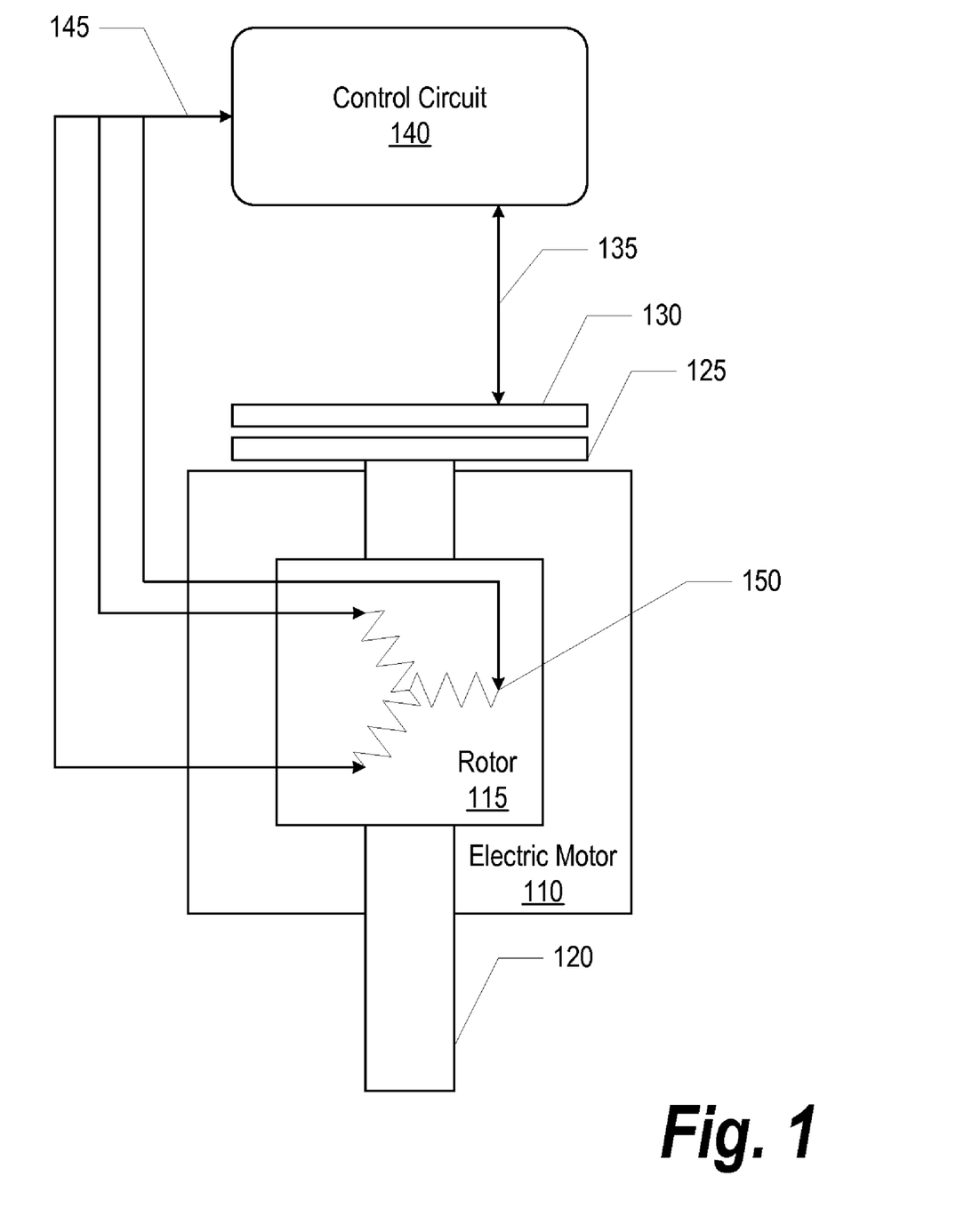
FIG. 1 is a block diagram illustrating a system for detecting an angular position of an electric motor, in accordance with some embodiments.

FIG. 1 is a block diagram illustrating a system for detecting an angular position of an electric motor, in accordance with some embodiments.

In some embodiments, electric motor 110 is configured to receive electrical power and to convert the electrical power to mechanical energy, which may be transferred to a load through axle 120. The motor may be a three-phase electric motor and may include three stator coils 150 configured to receive AC current through electric lines 145. The changing magnetic field generated by stator coils 150 generates a torque on rotor 115 and axle 120. In some embodiments, rotor 115 may include one or more pairs of north-south power magnets. In other embodiments, rotor 115 may include electromagnets that generate magnetic fields using coils and DC current. In some embodiments, control circuit 140 is configured to generate appropriate currents to supply to stator coils 150 through electrical lines 145. Depending on the rotational speed, direction of the rotational speed, and position of the rotor, currents having an appropriate amplitude and phase must be supplied to the stator coils to generate optimal rotation of the rotor.

Electric motor 110 may also include one or more digital sensors that are coupled to control circuit 140 using electrical line 135. In some embodiments, the digital sensors may include detectors 130 that may be stationary and transition rings 125 containing high and low signal information that may be detected by detectors 130 while transition rings 125 rotate relative to detectors 130.

The digital sensor may be any suitable device that can generate a series of low and high signals while the transition ring rotates in relation to the detector. For example, the digital sensor may be a laser that is either reflected or not by the transition ring; a Hall sensor rotating over north and south magnets, a reluctance sensor, etc.

Figure 2:
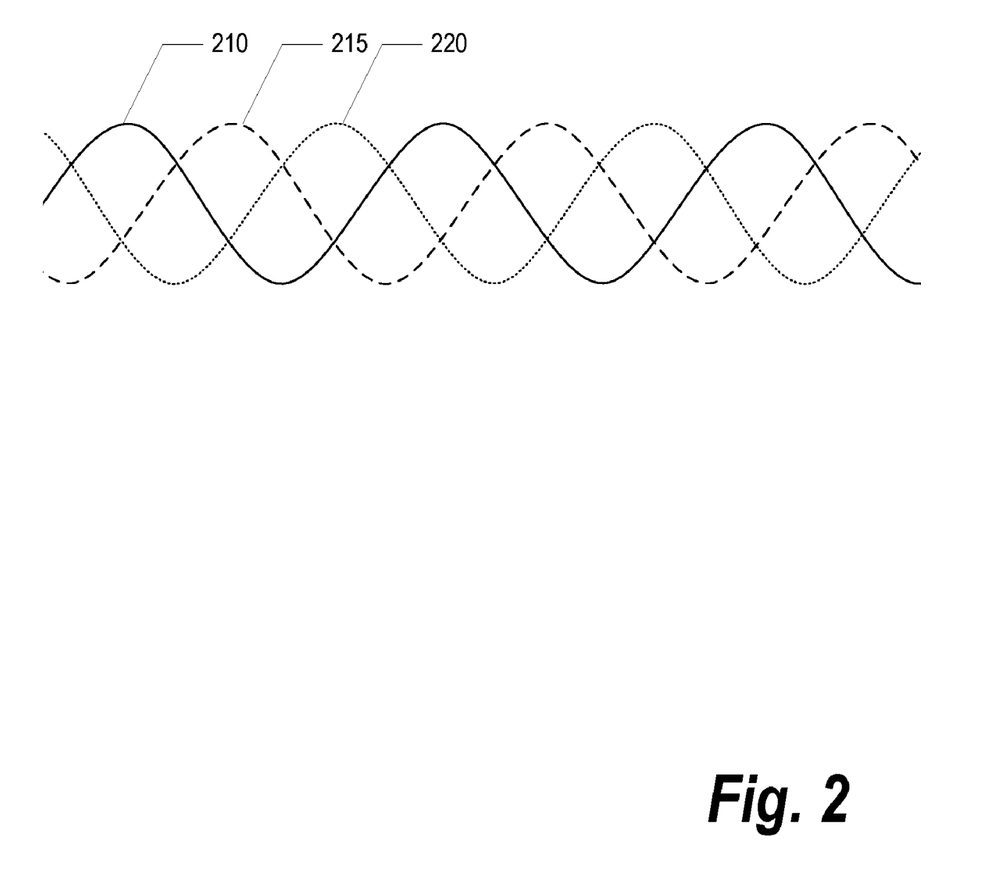
FIG. 2 is a graphical representation illustrating example signals returned from the stator coils of an electric motor indicating a position of the electric motor, in accordance with some embodiments.

FIG. 2 is a graphical representation illustrating example signals returned from the stator coils of an electric motor indicating a position of the electric motor, in accordance with some embodiments.

In some embodiments, an initial angular position of the electric motor may be determined by sending electrical pulses to stator coils 150 using control circuit 140 (shown in FIG. 1). Shown in this figure are the times the electric pulses return to control circuit 140 for different positions of rotor 115. Graphs 210, 215, and 220 correspond to each of stator coils 150. The timing of the returning pulses from each of the stator coils depends on the angular position of the rotor. In some embodiments, a single pulse from a single stator coil may be used to determine an initial position of the rotor. In other embodiments, for increased accuracy, additional pulses may be sent through the single stator coil and then averaged. For additional accuracy pulses may be sent through one or more additional stator coils (or more multiple averaged pulses). The results from all stator coils may then be compared to determine a more accurate angular position for the rotor.

A more detailed explanation of how to obtain an initial angular position of the electric motor is given in a paper by Marco Tursini, Member, IEEE, Roberto Petrella, Member, IEEE, and Francesco Parasiliti, titled "Initial Rotor Position Estimation Method for PM Motors", IEEE TRANSACTIONS ON INDUSTRY APPLICATIONS, VOL. 39, NO. 6, NOVEMBER/DECEMBER 2003, which is incorporated herein by reference.

Figure 3:
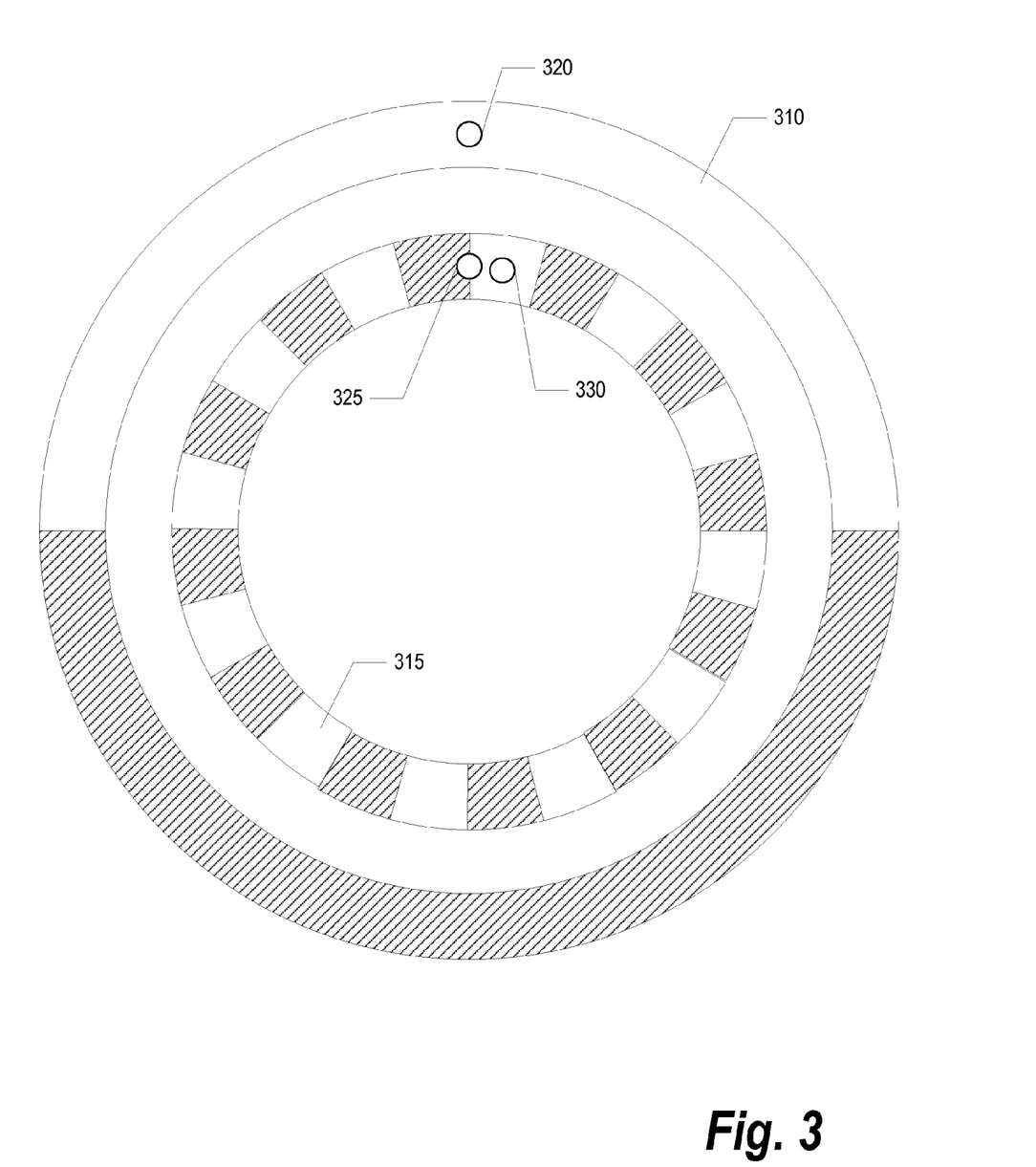
FIG. 3 is a block diagram illustrating digital sensors used in the determination of the angular position of an electric motor, in accordance with some embodiments.

FIG. 3 is a block diagram illustrating digital sensors used in the determination of the angular position of an electric motor, in accordance with some embodiments.

A low resolution digital monitor may include detector 320 and transitions ring 310. In some embodiments, detector 320 may be mounted such that detector 320 rotates relative to transitions ring 320 when the electric motor rotates. For example, transition ring 310 may be connected to the rotor of the electric motor, and detector 320 may be mounted to a stationary portion of the electric motor or vice versa.

Any suitable digital sensor may be used that can generate low and high type signals. In some embodiments, a hall sensor may be used as the detector and magnets may be used for the transition rings. A south magnet, for example, may indicate a low value (hashed portion of the ring) and a north magnet may be used to indicate a high value. Other similar digital sensors may be used such a laser light as the detector and reflective/non-reflective surfaces as the transition ring. A reluctance type sensor may also be used.

One or two or more high resolution digital sensors may also be used. In some embodiments, detector 325 and 330 may be used in combination with transitions ring 315. The hashed surfaces may indicate the high values of the signal, for example. In some embodiments, the two high-resolution sensors may be in quadrature with each other—90 degrees out-of-phase with each other.

Figure 4:
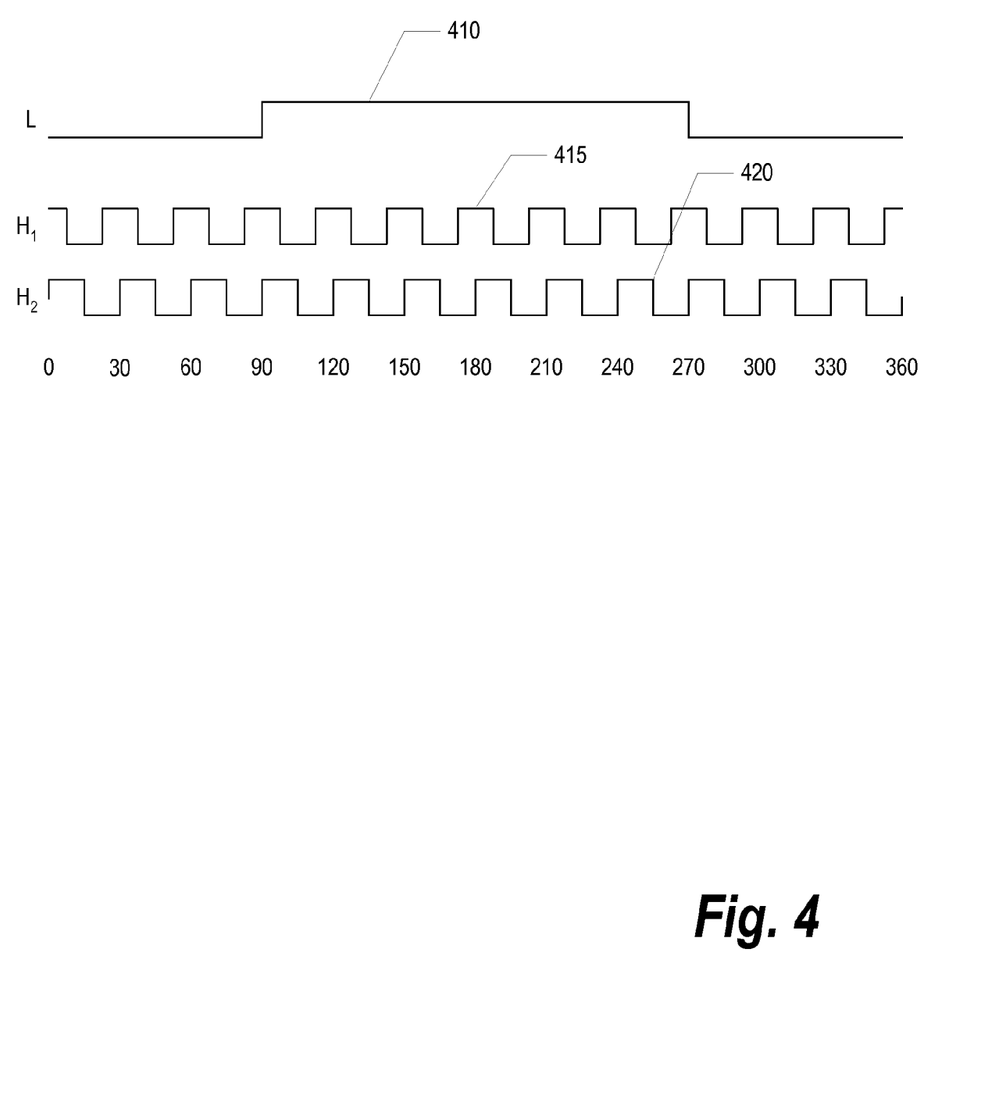
FIG. 4 is a graphical representation illustrating signals received from digital sensors used in the determination of the angular position of an electric motor, in accordance with some embodiments.

Example signals generated by the digital sensors are provided in FIG. 4.

Additional low resolution sensors may be used (not shown here) for increased accuracy and reliability.

FIG. 4 is a graphical representation illustrating signals received from digital sensors used in the determination of the angular position of an electric motor, in accordance with some embodiments.

As shown in the figure, signal 410 (L) may be generated from detector 320 and transition ring 310, signal 415 ($H_1$) may be generated from detector 330 and transition ring 315, and signal 420 ($H_2$) may be generated using detector 325 and again transition ring 315.

An angular position of the electric motor may be determined when a transition in signal 410 occurs. The transitions may be calibrated to correspond to known angular positions. A transition may be identified by examining high resolution signals 415 and 420. For example, if a rising transition is detected in signal 410 and a rising transition is detected in signal 420, the transition corresponds to the angular position at 90 degrees. If on the other hand a falling transition is detected on signal 420, the transition corresponds to the angular position at 270 degrees.

Similarly, the direction of rotation may be determined. In the example above, the first scenario would correspond to a clockwise rotation and the second scenario would correspond to counter-clockwise rotation.

Figure 5:
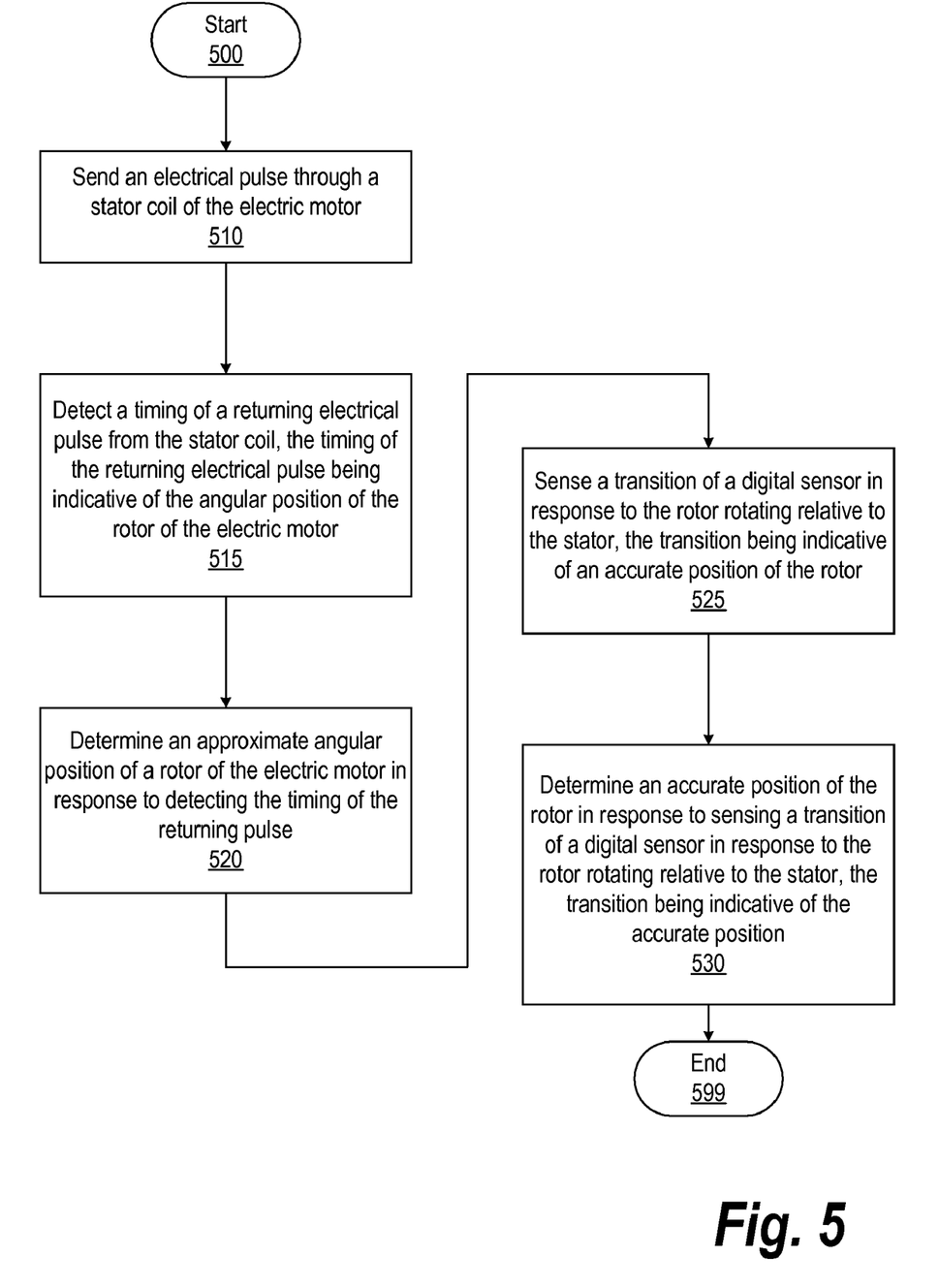
FIG. 5 is a flow diagram illustrating a method for detecting the angular position of an electric motor, in accordance with some embodiments.

FIG. 5 is a flow diagram illustrating a method for detecting the angular position of an electric motor, in accordance with some embodiments.

Processing begins at 500 whereupon, at block 510, an electrical pulse is sent through a stator coil of the electric motor.

At block 515, a timing of a returning electrical pulse from the stator coil is detected, the amplitude of the returning electrical pulse being indicative of the angular position of the rotor of the electric motor.

At block 520, an approximate angular position of a rotor of the electric motor is determined in response to detecting the timing of the returning pulse.

At block 525, a transition of a digital sensor is sensed in response to the rotor rotating relative to the stator, the transition being indicative of an accurate position of the rotor.

At block 530, an accurate position of the rotor is determined in response to sensing a transition of a digital sensor in response to the rotor rotating relative to the stator, the transition being indicative of the accurate position of the rotor.

Processing subsequently ends at 599.

FIG. 1 shows an example of a system that may be used to perform the method described here.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for detecting an angular position of an electric motor, the method comprising:
   sending an electrical pulse through a stator coil of the electric motor;
   determining an approximate angular position of a rotor of the electric motor in response to detecting a timing of a returning electrical pulse from the stator coil, the timing of the returning electrical pulse being indicative of the angular position of the rotor; and
   determining an accurate position of the rotor in response to sensing a transition of a digital sensor in response to the rotor rotating relative to the stator, the transition being indicative of the accurate position.

2. The method of claim 1, further comprising:
   sending one or more additional electrical pulses through corresponding one or more additional stator coils of the electric motor;
   detecting one or more additional timings of one or more additional returning electrical pulses from the one or more additional stator coils, the timing of the one or more additional returning electrical pulses being indicative of the position of the rotor of the electric motor; and
   determining the approximate position of the rotor in response to detecting the timing and the one or more additional timings.

3. The method of claim 1, further comprising:
   sensing high resolution transitions using a first high resolution digital sensor and a second high resolution digital sensor in response to the rotor rotating relative to the stator, the first high resolution digital sensor and the second high resolution digital sensor being in quadrature with each other, one of the high resolution transitions occurring at substantially the same angular position as the transition; and
   determining a direction of rotation of the rotor by comparing the transition, the first high resolution transition, and the second high resolution transition.

4. The method of claim 1, further comprising determining a very accurate position of the rotor by detecting a pre-calibrated transition, the pre-calibrated transition being one of the transitions, the pre-calibrated transition having been pre-calibrated to the very accurate position.

5. The method of claim 1, where sending the electrical pulse occurs when an angular velocity is substantially equal to zero.

6. The method of claim 1, where the electric motor comprises additional rotor magnets.

7. A system for detecting an angular position of an electric motor, the system comprising:

a rotor configured to generate a magnetic field;
one or more stator coils rotatively coupled to the rotor;
a digital sensor positioned such that the digital sensor senses relative motion between the rotor and the one or more stator coils;
a control circuit electrically coupled to the one or more stator coils and to the digital sensor;
the control circuit being configured to:
  send an electrical pulse through the one or more stator coils,
  receive a returning electrical pulse,
  detect a timing of the returning electrical pulse,
  in response thereto, determine an approximate angular position of the rotor,
  the timing of the returning electrical pulse being indicative of the angular position of the rotor,
  receive a signal from the digital sensor indicating sensed transitions;
  determine an accurate position of the rotor in response to receiving the signal from the digital sensor.

8. The system of claim 7, further comprising additional stator coils coupled to the rotor, and where the control circuit is further configured to:
  send one or more additional electrical pulses through the corresponding additional stator coils,
  receive additional returning electrical pulses,
  detect additional timings of the additional returning electrical pulses,
  determine the approximate position of the rotor in response to detecting the timing and the one or more additional timings.

9. The system of claim 7, further comprising a first high resolution digital sensor and a second high resolution digital sensor, the first and second high resolution sensors being positioned such that the digital sensor senses relative motion between the rotor and the one or more stator coils, the first and second high resolution sensors being electrically coupled to the control circuit, the control circuit being further configured to:
  sense high resolution transitions from the first high resolution digital sensor and from the second high resolution digital sensor in response to the rotor rotating relative to the stator, the first high resolution digital sensor and the second high resolution digital sensor being in quadrature with each other, one of the high resolution transitions occurring at substantially the same angular position as the transition; and
  determine a direction of rotation of the rotor by comparing the transition, the first high resolution transition, and the second high resolution transition.

10. The system of claim 7, further comprising the control circuit being configured to determine a very accurate position of the rotor by detecting a pre-calibrated transition of the digital sensor, the pre-calibrated transition being one of the transitions, the pre-calibrated transition having been pre-calibrated to the very accurate position.

11. The system of claim 7, where the control circuit sending the electrical pulse occurs when an angular velocity is substantially equal to zero.

12. The system of claim 7, where the electric motor comprises additional rotor magnets.

13. An electric motor comprising:
a rotor configured to generate a magnetic field;
one or more stator coils rotatively coupled to the rotor;
a digital sensor positioned such that the digital sensor senses relative motion between the rotor and the one or more stator coils;
a control circuit electrically coupled to the one or more stator coils and to the digital sensor;
the control circuit being configured to:
  send an electrical pulse through the one or more stator coils,
  receive a returning electrical pulse,
  detect a timing of the returning electrical pulse,
  in response thereto, determine an approximate angular position of the rotor,
  the timing of the returning electrical pulse being indicative of the angular position of the rotor,
  receive a signal from the digital sensor indicating sensed transitions;
  determine an accurate position of the rotor in response to receiving the signal from the digital sensor.

14. The electric motor of claim 13, further comprising additional stator coils coupled to the rotor, and where the control circuit is further configured to:
  send one or more additional electrical pulses through the corresponding additional stator coils,
  receive additional returning electrical pulses,
  detect additional timings of the additional returning electrical pulses,
  determine the approximate position of the rotor in response to detecting the timing and the one or more additional timings.

15. The electric motor of claim 13, further comprising a first high resolution digital sensor and a second high resolution digital sensor, the first and second high resolution sensors being positioned such that the digital sensor senses relative motion between the rotor and the one or more stator coils, the first and second high resolution sensors being electrically coupled to the control circuit, the control circuit being further configured to:
  sense high resolution transitions from the first high resolution digital sensor and from the second high resolution digital sensor in response to the rotor rotating relative to the stator, the first high resolution digital sensor and the second high resolution digital sensor being in quadrature with each other, one of the high resolution transitions occurring at substantially the same angular position as the transition; and
  determine a direction of rotation of the rotor by comparing the transition, the first high resolution transition, and the second high resolution transition.

16. The electric motor of claim 13, further comprising the control circuit being configured to determine a very accurate position of the rotor by detecting a pre-calibrated transition of the digital sensor, the pre-calibrated transition being one of the transitions, the pre-calibrated transition having been pre-calibrated to the very accurate position.

17. The electric motor of claim 13, where the control circuit sending the electrical pulse occurs when an angular velocity is substantially equal to zero.

18. The electric motor of claim 13, where the electric motor comprises additional rotor magnets.

* * * * *